US009646236B1

(12) United States Patent
Guenter et al.

(10) Patent No.: US 9,646,236 B1
(45) Date of Patent: May 9, 2017

(54) ENCODING AND DECODING DATA IN TWO-DIMENSIONAL SYMBOLOGY

(71) Applicant: INTERNATIONAL BUSINESS MACHINES CORPORATION, Armonk, NY (US)

(72) Inventors: Erich Guenter, Hofheim (DE); Mark E. Maresh, Wake Forest, NC (US); Colm Nolan, Meath (IR); Juan F. Vargas, Rochester, MN (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/967,429

(22) Filed: Dec. 14, 2015

(51) Int. Cl.
*G06K 19/06* (2006.01)

(52) U.S. Cl.
CPC . *G06K 19/06103* (2013.01); *G06K 19/06037* (2013.01)

(58) Field of Classification Search
USPC .......... 235/494, 440, 462.1, 462.04
See application file for complete search history.

(56) References Cited

U.S. PATENT DOCUMENTS

| | | | |
|---|---|---|---|
| 5,591,956 A * | 1/1997 | Longacre, Jr. ..... | G06K 7/10851 235/462.09 |
| 5,862,270 A * | 1/1999 | Lopresti ............... | G06K 1/121 235/456 |
| 2004/0200904 A1 * | 10/2004 | Pinson ............. | G06K 19/06037 235/494 |
| 2006/0196950 A1 | 9/2006 | Kiliccote | |
| 2009/0050700 A1 * | 2/2009 | Kamijoh ............ | G06K 17/0022 235/440 |
| 2010/0147961 A1 * | 6/2010 | Jancke ............. | G06K 19/06037 235/494 |

(Continued)

FOREIGN PATENT DOCUMENTS

| | | |
|---|---|---|
| EP | 2749418 A1 | 7/2014 |
| WO | 2005104020 A1 | 11/2005 |
| WO | 2015025339 A1 | 2/2015 |

OTHER PUBLICATIONS

L.D. Paulson, "Scanning the Future with New Barcodes", Computer Society, IEEE, Jan. 2011, pp. 1-4.

*Primary Examiner* — Allyson Trail
(74) *Attorney, Agent, or Firm* — Cantor Colburn LLP; Damion Josephs

(57) ABSTRACT

Examples of techniques for encoding data in a 2D symbology are disclosed. In one example implementation according to aspects of the present disclosure, a computer-implemented comprises assigning a first color representative of a 0-bit and a second color representative of a 1-bit. The method further comprises designating a starting cell pair and an ending cell pair. The method also comprises generating, by a processing device, the 2D symbology. The 2D symbology comprises a series of cells in a cell space starting with the starting cell pair and ending with the ending cell pair. Each cell between the starting cell pair and the ending cell pair corresponds to a bit of a binary string and has a common cell length. The cells corresponding to a 0-bit are colored the first color and the cells corresponding to a 1-bit are colored the second color.

17 Claims, 7 Drawing Sheets

(56) References Cited

U.S. PATENT DOCUMENTS

| | | | |
|---|---|---|---|
| 2012/0175419 A1* | 7/2012 | O'Keefe | G06K 19/06037 |
| | | | 235/437 |
| 2012/0298753 A1 | 11/2012 | Zolotov | |
| 2013/0157760 A1* | 6/2013 | Boudville | G06K 7/12 |
| | | | 463/31 |
| 2014/0252096 A1 | 9/2014 | Nemet et al. | |
| 2014/0346231 A1 | 11/2014 | Al-Omari et al. | |
| 2016/0292486 A1* | 10/2016 | Prusik | G06K 19/06037 |

* cited by examiner

ENCODING AND DECODING DATA IN TWO-DIMENSIONAL SYMBOLOGY

BACKGROUND

The present disclosure relates to two-dimensional (2D) symbology, and more particularly, relates to techniques for encoding and decoding data in two-dimensional symbology.

A 2D symbology is a two-dimensional representation of information. A 2D symbology (i.e., Data Matrix codes) can be read by an imaging device (such as a camera, scanner, etc.) and information contained within the 2D symbology can be decoded. Some current 2D symbologies encode data that is readable and decodable by processing systems but most existing 2D symbologies are not able to convey useful information to a human without being decoded by the processing system. In addition, some current 2D symbologies have rigid spatial, size, orientation, and/or layout requirements, providing little flexibility in their presentation. Examples of some existing 2D symbologies include Data Matrix codes, Quick Response (QR) codes, Aztec codes, Semacodes, PDF417 codes, and various other matrix codes.

SUMMARY

In accordance with aspects of the present disclosure, a computer-implemented method for encoding data in a 2D symbology is provided. The method comprises assigning a first color representative of a 0-bit and a second color representative of a 1-bit. The method further comprises designating a starting cell pair and an ending cell pair. The method also comprises generating, by a processing device, the 2D symbology. The 2D symbology comprises a series of cells in a cell space starting with the starting cell pair and ending with the ending cell pair. Each cell between the starting cell pair and the ending cell pair corresponds to a bit of a binary string and has a common cell length. The cells corresponding to a 0-bit are colored the first color and the cells corresponding to a 1-bit are colored the second color.

In accordance with additional aspects of the present disclosure, a system for encoding data in a 2D symbology is provided. The system comprises a processor in communication with one or more types of memory. The processor is configured to assign a first color representative of a 0-bit and a second color representative of a 1-bit. The processor is further configured to designate a starting cell pair and an ending cell pair. The processor is also configured to generate the 2D symbology. The 2D symbology comprises a series of cells in a cell space starting with the starting cell pair and ending with the ending cell pair. Each cell between the starting cell pair and the ending cell pair corresponds to a bit of a binary string and has a common cell length. The cells corresponding to a 0-bit are colored the first color and the cells corresponding to a 1-bit are colored the second color.

In accordance with yet additional aspects of the present disclosure, a computer program product for encoding data in a 2D symbology is provided. The computer program product comprises a non-transitory storage medium readable by a processing circuit and storing instructions for execution by the processing circuit for performing a method. The method comprises assigning a first color representative of a 0-bit and a second color representative of a 1-bit. The method further comprises designating a starting cell pair and an ending cell pair. The method also comprises generating the 2D symbology. The 2D symbology comprises a series of cells in a cell space starting with the starting cell pair and ending with the ending cell pair. Each cell between the starting cell pair and the ending cell pair corresponds to a bit of a binary string and has a common cell length. The cells corresponding to a 0-bit are colored the first color and the cells corresponding to a 1-bit are colored the second color.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of encoding and decoding data in two-dimensional symbologies. To encode and decode data in a 2D symbology, the present techniques utilize straight-line color differentiation using a series of cells corresponding to a binary string. Each of the cells of the series of cells has a common cell length, and non-uniform spacing between each of the cells may be implemented. In examples of encoding binary data, two representative colors are used with a first color representing a 0-bit and a second color representing a 1-bit. A 2-bit starting cell and a 2-bit ending cell are utilized to establish the start and end of the series of cells. Each of the cells of the series of cells between the starting cell and the ending cell corresponds to a bit of a binary string.

In some implementations, the present techniques enable 2D symbology to be flexible in terms of spatial, size, orientation, and/or layout specifications. Moreover, the present techniques may enable a 2D symbology to be human-recognizable (e.g., text, a logo, a symbol, etc.). These and other advantages will be apparent from the description that follows.

Figure 1:
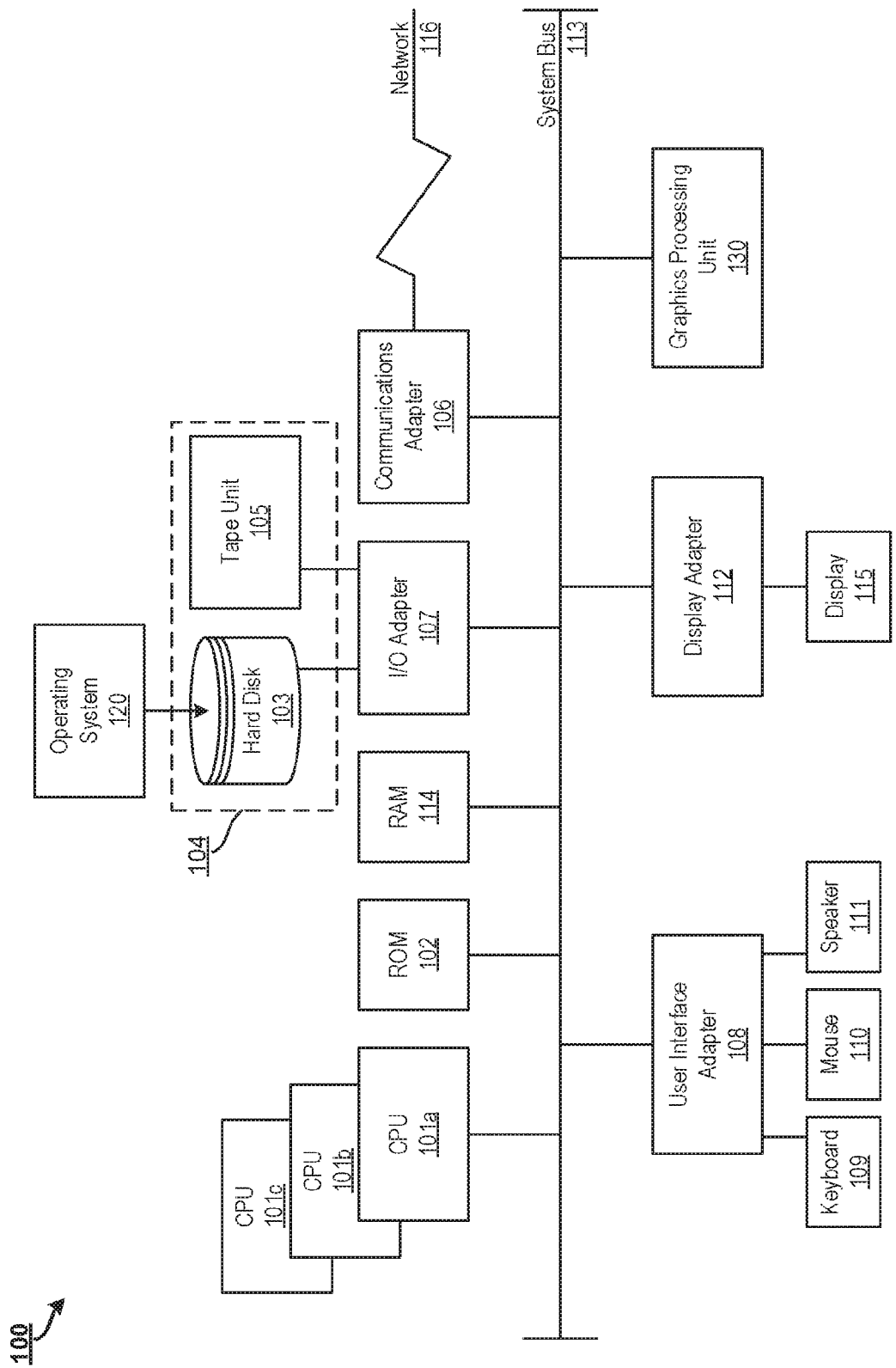
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
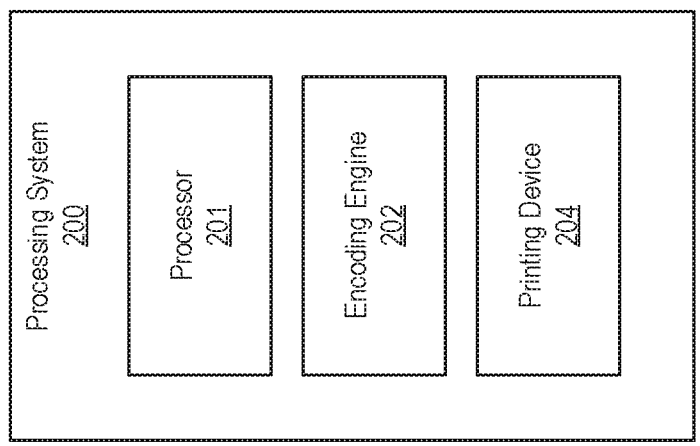
FIG. 2 illustrates a processing system for encoding data in two-dimensional symbology according to examples of the present disclosure.

FIG. 2 illustrates a processing system 200 for encoding data in two-dimensional symbology according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 200 may include a processor 201, an encoding engine 202, and a printing device 204. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Encoding engine 202 enables the processing system 200 to encode data into a 2D symbology by assigning a first color to represent a 0-bit and a second color to represent a 1-bit in a binary string. For example, the color "blue" may represent a 0-bit and the color "red" may represent a 1-bit. In other examples, alternative colors may be used instead. In further examples, two different shades of the same color may be used to represent the different bits. In aspects of the present disclosure, multiple colors may be used to represent additional bits (e.g., four colors for four bits, eight colors for eight bits, etc.).

Encoding engine 202 also designates a starting cell pair and an ending cell pair. The starting cell pair may represent two cells, each of a different color, with the first cell being of a second color and representing the 1-bit and the second cell being of a first color and representing the 0-bit. The ending cell pair may represent two cells, both of the second color representing the 1-bit. In other examples, the starting cell pair and/or the ending cell pair may be of a different length or configuration.

The starting cell pair is assigned to a specific location with respect to the cell space (e.g., the upper left corner of the cell space), and the ending cell pair is assigned to an opposite specific location with respect to the cell space and the starting cell pair (e.g., the lower right corner of the cell space). This enables a processing system decoding the 2D symbology (e.g., processing system 300 of FIG. 3) to recognize the start and the end of the series of cell.

Printing device 204 prints the 2D symbology generated by encoding engine 202. For example printing device 204 may be a printer or other image creation device configured to print or otherwise display the 2D symbology. In examples, printing device 204 is a printer configured to print the 2D symbology on a physical medium such as paper. In other examples, printing device 204 is an electronic display configured to display the 2D symbology electronically.

Figure 3:
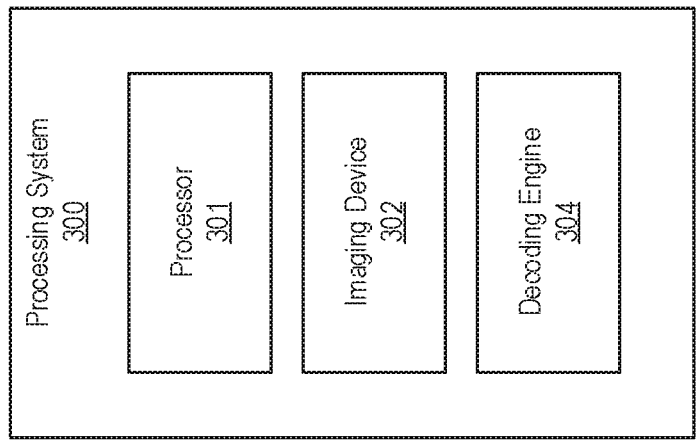
FIG. 3 illustrates a processing system for decoding data in two-dimensional symbology according to examples of the present disclosure.

FIG. 3 illustrates a processing system 300 for decoding data in two-dimensional symbology according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 300 may include a processor 301, an imaging device 302, and a decoding engine 304. Alternatively or additionally, the processing system 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Imaging device 302 captures an image of a 2D symbology. The 2D symbology comprises a series of cells in a cell space. Each of the cells in the series of cells corresponds to a bit of a binary string, and each of the cells has a common cell length such that each of the cells are the same length. In examples, the imaging device 302 is a camera, scanner, or other device configured to capture an image, such as of a 2D symbology.

Decoding engine 304 recognizes a starting cell pair and an ending cell pair in the series of cells. The starting cell pair defines a first color representative of a 0-bit and defines a second color representative of a 1-bit. For example, the starting cell pair may be a red cell followed by a blue cell. In some examples, the red cell represents a 0-bit while the blue cell represents a 1-bit. In other examples, the red cell represents the 1-bit while the blue cell represents the 0-bit. The ending cell pair may be two 1-bit cells in succession in some examples or may be two 0-bit cells in succession in other examples. According to aspects of the present disclosure, the starting cell pair may be a single cell of a first color representing a 1-bit while the ending cell pair may be two 0-bits representing the second color.

Decoding engine 304 then extracts the binary string from the 2D symbology by reading each of the cells in the series of cells between the starting cell pair and the ending cell pair. The cells corresponding to a 0-bit are colored the first color and cells corresponding to a 1-bit are colored the second color. In examples, the reading occurs left to right, top to bottom. For example, once the starting cell pair is recognized, the 2D symbology may be oriented such that the starting cell pair is top left. Decoding engine 304 then reads each of the cells in the series of cells after the starting cell pair until decoding engine 304 reaches the ending cell pair.

According to aspects of the present disclosure, the series of cells in the cell space making up the 2D symbology are surrounded by a contiguous non-message space that extends a distance greater than the common cell length from the cell space. The contiguous non-message space is of a color different than both the first color and the second color.

Figure 4A:
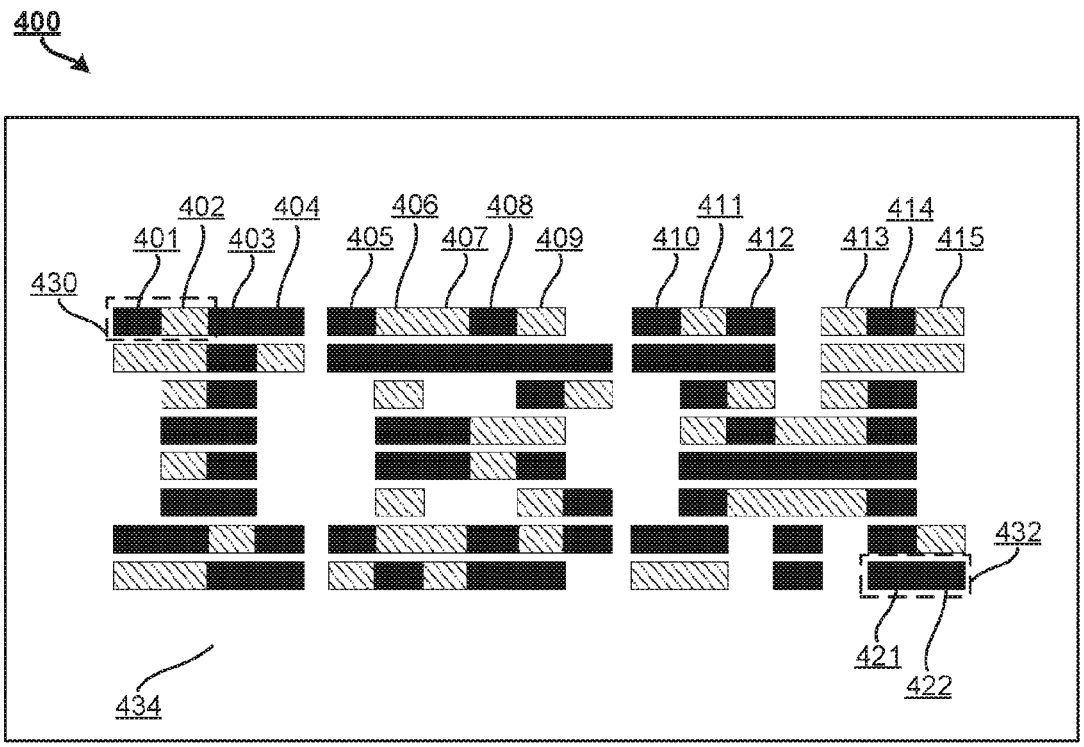
FIGS. 4A and 4B illustrate a two-dimensional symbology according to examples of the present disclosure.
Figure 4B:
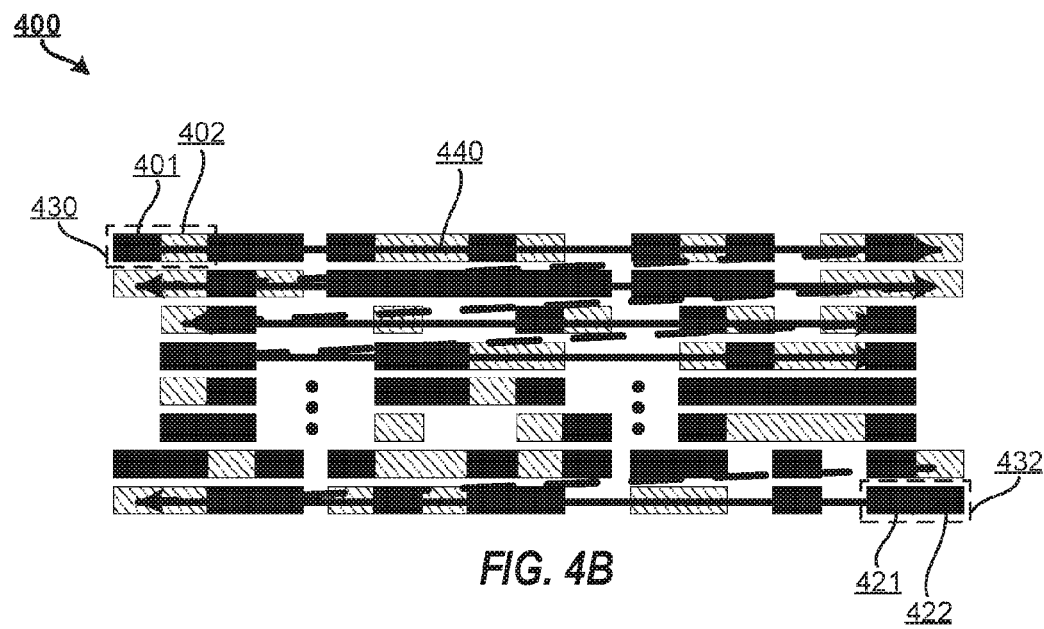

FIGS. 4A and 4B illustrate a two-dimensional symbology 400 according to examples of the present disclosure. In the example of FIGS. 4A and 4B, cell 401 (a solid black cell) represents a 1-bit and cell 402 (a shaded cell) represents a 0-bit. Although the cells are illustrated as being either solid or shaded cells, should be appreciated that the solid and shading may represent different colors. For example, a 1-bit cell (i.e., cell 401) may be a first color and the 0-bit cell (i.e., cell 402) may be a second color in aspects of the present disclosure. The combination of the 1-bit cell followed by the 0-bit cell (i.e., cell 401 followed by cell 402) acts as starting cell pair 430, which acts to assign colors to each of the 0-bit and the 1-bit, while the combination of the 1-bit cell followed by the 1-bit cell (i.e., cell 421 followed by cell 422) acts as ending cell pair 432.

The cells between starting cell pair 430 and ending cell pair 432 represents a binary string. For example, the cells of the first (top) row, starting with cell 403 after starting cell pair 430, represent a first portion of a binary string 01110010101010. The second row of cells, for example, represents another portion of the binary string 0010111111111000. FIG. 4B illustrates one example pattern for reading the cells. In this example, the reading occurs left to right, top to bottom following arrow 440 from starting cell pair 430 to ending cell pair 432.

The cells continue to represent portions of the binary string until the ending cell pair is reached. The values of the starting cell pairs and the values of the ending cell pairs are not part of the binary string. The portions are combined to form the binary string.

In the present example, the cells each have a common cell length (i.e., the length of the cells does not vary and is standard across each of the cells). Although the cells are also illustrated as having a common cell height in the present example, the cell height may vary in other examples. It should be appreciated that two cells may not be contiguous, and that horizontal spacing between the individual cells may vary and need not be uniform. For example, horizontal spacing exists between cells 404 and 405, between cells 409 and 410, and between cells 412 and 413. However, the respective horizontal spacing is different. Additionally, some of the cells are contiguous. For example, cells 401, 402, 403, 404, cells 405, 406, 407, 408, 409, cells 410, 411, 412, and 413, 414, 415 are contiguous with spacing between those respective groupings of cells. Moreover, while the present example illustrates horizontal parallel rows of cells, vertical parallel columns of cells may be implemented in other examples.

Figure 5:
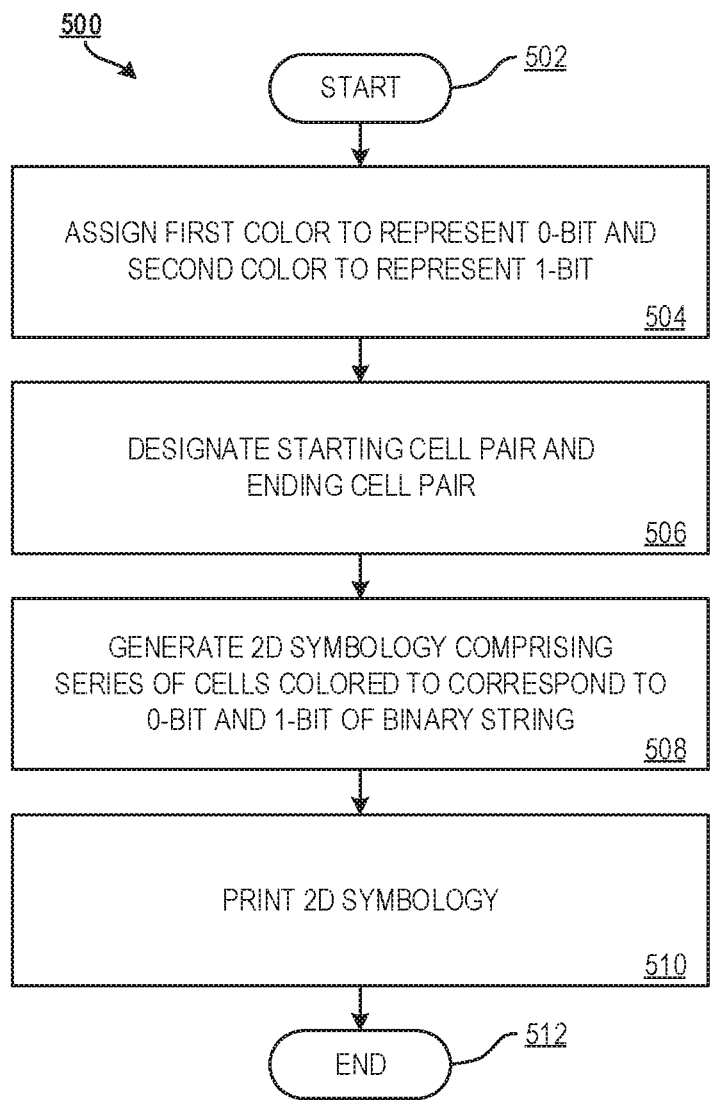
FIG. 5 illustrates a flow diagram of a method for encoding data in two-dimensional symbology according to examples of the present disclosure.

The cells are arranged within a cell space that is surrounded by a contiguous non-cell space 434. Contiguous non-cell space 434 extends a distance greater than the common cell length from the cell space and being of a color different than the first color and the second color FIG. 5 illustrates a flow diagram of a method 500 for encoding data in two-dimensional symbology according to examples of the present disclosure. The method 500 begins at block 502 and continues to block 504.

At block 504, the method includes assigning a first color to represent a 0-bit and assigning a second color to represent a 1-bit.

At block 506, the method 500 includes designating a starting cell pair and designating an ending cell pair. The starting cell pair may be a 2-bit starting cell pair and the ending cell pair may be a 2-bit ending cell pair. In examples, the starting cell pair is designated as a 0-bit and a 1-bit and the ending cell pair is designated as a 1-bit and a 1-bit. Other configurations of starting cell pairs and ending cell pairs may be utilized.

At block 508, the method 500 includes generating the 2D symbology. The 2D symbology includes a series of cells in a cell space starting with the starting cell pair and ending with the ending cell pair. The series of cells may be organized in horizontal rows, for example, and a horizontal spacing between each of the cells may vary. In this example, the horizontal spacing between the cells is less than the common cell length. In some aspects, two cells may be adjacent to each other horizontally such that no horizontal spacing exists between the two cells. Various combinations of horizontal spacing may exist within a horizontal row of cells.

In additional aspects of the present disclosure, the series of cells may be organized in vertical columns, for example, and a vertical spacing between each of the cells may vary. In this example, the horizontal spacing between the cells is less than the common cell length. Two cells may be adjacent to each other vertically such that no vertical spacing exists between the two cells. Various combinations of vertical spacing may exist within a vertical column of cells.

At block 510, the method 500 includes printing the 2D symbology in the cell space. The cell space is surrounded by a contiguous non-cell space that extends a distance that is greater than the common cell length from the cell space. The contiguous non-cell space is a color different than the first color and the second color. This enables the cells to be differentiated in color from the contiguous non-cell space. In examples, the series of cells may be printed in a plurality of horizontal parallel rows. Each of the plurality of horizontal parallel rows includes at least one cell of the series of cells. A vertical space may exist between each of the plurality of horizontal parallel rows, but the vertical space is less than the common cell length. Any horizontal spacing between individual cells arranged within the plurality of horizontal parallel rows may vary and may be contiguous and/or non-contiguous.

In other examples, the series of cells may be printed in a plurality of vertical parallel columns, with each of the plurality of vertical columns including at least one cell of the series of cells. In this case, a horizontal space between each of the plurality of vertical parallel columns is less than the common cell length. Any vertical spacing between individual cells arranged within the plurality of vertical parallel columns may vary and may be contiguous and/or non-contiguous. The method 500 continues to block 512 and terminates.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
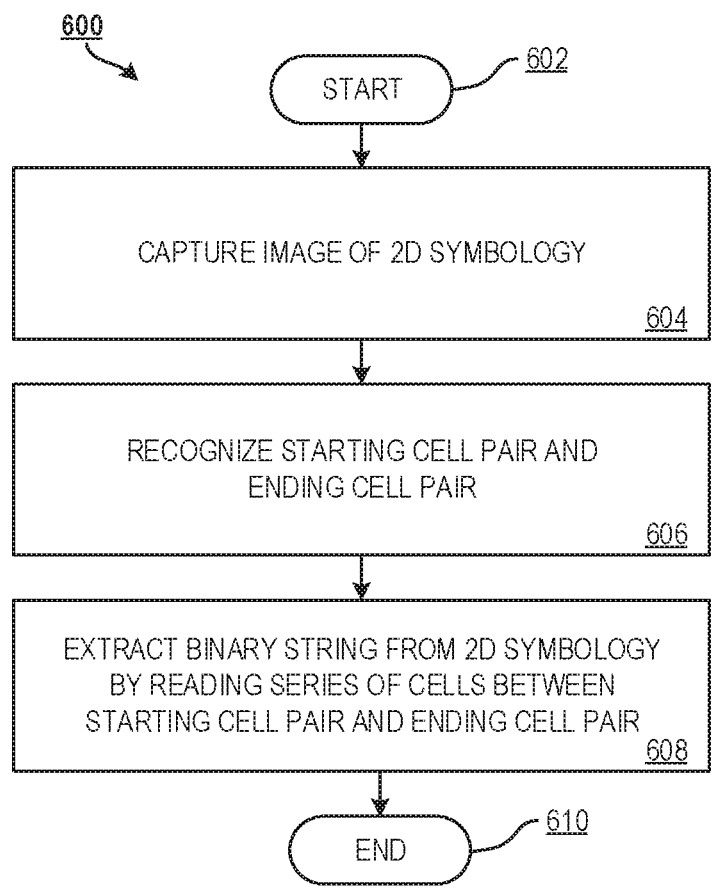
FIG. 6 illustrates a flow diagram of a method for decoding data in two-dimensional symbology according to examples of the present disclosure.

FIG. 6 illustrates a flow diagram of a method 600 for decoding data in two-dimensional symbology according to examples of the present disclosure. The method 600 begins at block 602 and continues to block 604.

At block 604, the method 600 includes capturing an image of a 2D symbology. The image comprises a series of cells in a cell space. Each cell in the series of cells corresponds to a bit of a binary string and has a common cell length. In examples according to the present disclosure, capturing the image includes delineating an overall message space (e.g., a contiguous, unbroken, non-symbol space surrounding the image).

At block 606, the method 600 includes recognizing a starting cell pair and an ending cell pair. For example, the starting cell pair defines a first color that represents a 1-bit and a second color that represents a 0-bit. It should be appreciated that the first color and second color are different colors or different shades of the same color. Each of the cells of the starting cell pair and ending cell pair are the common cell length such that each of the cells are the same length.

At block 608, the method 600 includes extracting the binary string from the 2D symbology by reading the series of cells between the starting cell pair and an ending cell pair. Each of the cells corresponds to either a 0-bit or a 1-bit depending on the cell's color. For example, cells corresponding to a 0-bit are colored the second color and cells corresponding to a 1-bit are colored the first color. In examples, the series of cells is surrounded by a contiguous non-cell space that extends from the cell space a distance greater than the common cell length. The non-cell space is a color different than the first color and different than the second color. The method 600 continues to block 610 and terminates.

Additional processes also may be included, and it should be understood that the processes depicted in FIG. 6 represent illustrations, and that other processes may be added or existing processes may be removed, modified, or rearranged without departing from the scope and spirit of the present disclosure.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
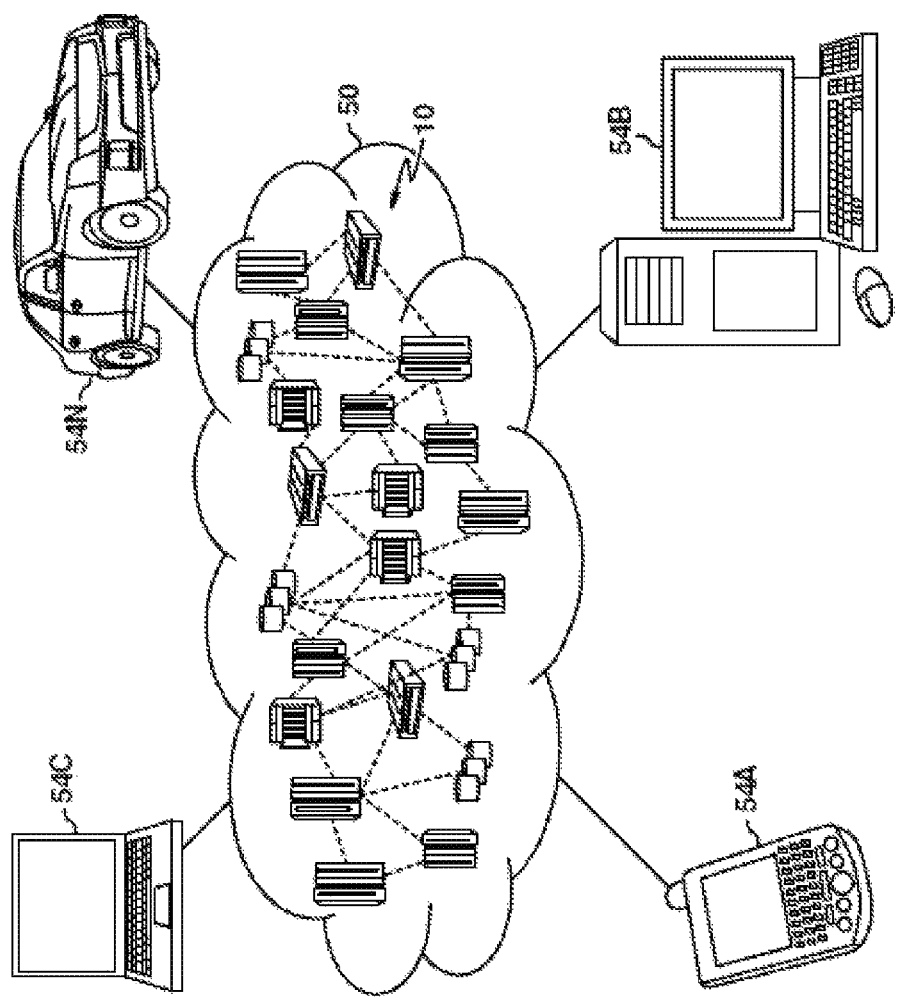
FIG. 7 illustrates a cloud computing environment according to examples of the present disclosure.

Referring now to FIG. 7, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
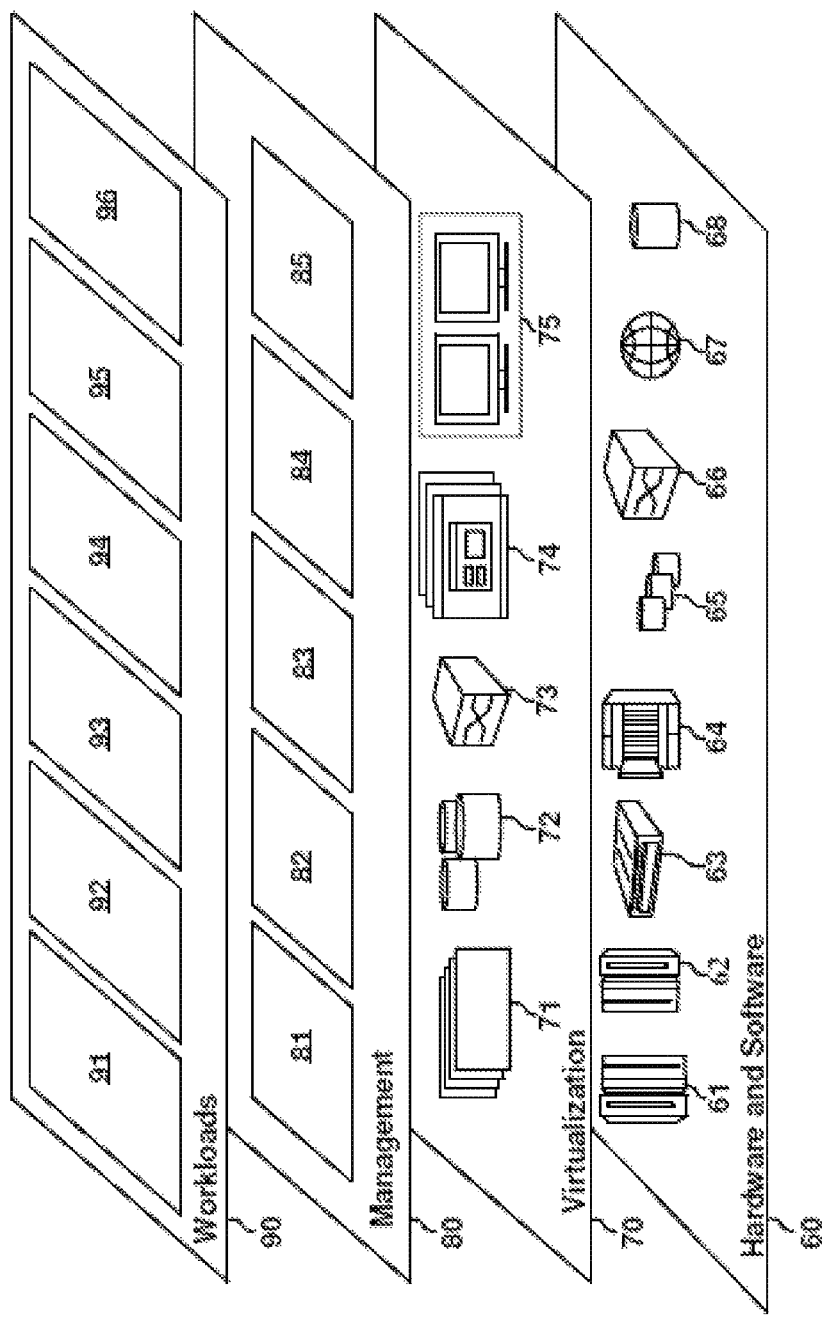
FIG. 8 illustrates abstraction model layers according to examples of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage of applications for mobile devices 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for encoding data in a two-dimensional (2D) symbology, the method comprising:
    assigning a first color representative of a 0-bit and a second color representative of a 1-bit;
    designating a starting cell pair and an ending cell pair;
    generating, by a processing device, the 2D symbology, the 2D symbology comprising a series of cells in a cell space starting with the starting cell pair and ending with the ending cell pair, each cell between the starting cell pair and the ending cell pair corresponding to a bit of a binary string and having a common cell length, wherein the cells corresponding to a 0-bit are colored the first color and the cells corresponding to a 1-bit are colored the second color; and
    printing the 2D symbology in the cell space, wherein the cell space is surrounded by a contiguous non-cell space extending a distance greater than the common cell length from the cell space and being of a color different than the first color and the second color.

2. The computer-implemented method of claim 1, wherein the starting cell pair is a 2-bit starting cell pair, and wherein the ending cell pair is a 2-bit ending cell pair.

3. The computer-implemented method of claim 2, wherein the starting cell pair is designated as a 0-bit and a 1-bit and wherein the ending cell pair is designated as a 1-bit and a 1-bit.

4. The computer-implemented method of claim 2, wherein the starting cell pair is designated as a 0-bit and a 1-bit and wherein the ending cell pair is designated as a 0-bit and a 0-bit.

5. The computer-implemented method of claim 2, wherein the starting cell pair is designated as a 1-bit and a 0-bit and wherein the ending cell pair is designated as a 1-bit and a 1-bit.

6. The computer-implemented method of claim 2, wherein the starting cell pair is designated as a 1-bit and a 0-bit and wherein the ending cell pair is designated as a 0-bit and a 0-bit.

7. The computer-implemented method of claim 1, wherein printing the series of cells comprises printing the series of cells in a plurality of horizontal parallel rows, and wherein each of the plurality of horizontal parallel rows comprises at least one cell of the series of cells.

8. The computer-implemented method of claim 7, wherein a vertical space between each of the plurality of horizontal parallel rows is less than the common cell length.

9. The computer-implemented method of claim 1, wherein at least two of the cells in the series of cells are non-contiguous.

10. The computer-implemented method of claim 1, wherein the series of cells are printed in a human-recognizable layout.

11. A system for encoding data in a two-dimensional (2D) symbology, the system comprising:
   a processor in communication with one or more types of memory, the processor configured to:
   assign a first color representative of a 0-bit and a second color representative of a 1-bit, designate a starting cell pair and an ending cell pair,
   generate the 2D symbology, the 2D symbology comprising a series of cells in a cell space starting with the starting cell pair and ending with the ending cell pair, each cell between the starting cell pair and the ending cell pair corresponding to a bit of a binary string and having a common cell length, wherein the cells corresponding to a 0-bit are colored the first color and the cells corresponding to a 1-bit are colored the second color; and
   print the 2D symbology in the cell space, wherein the cell space is surrounded by a contiguous non-cell space extending a distance greater than the common cell length from the cell space and being of a color different than the first color and the second color.

12. The system of claim 11, wherein the starting cell pair is a 2-bit starting cell pair, and wherein the ending cell pair is a 2-bit ending cell pair.

13. The system of claim 11, wherein printing the series of cells comprises printing the series of cells in a plurality of horizontal parallel rows, and wherein each of the plurality of horizontal parallel rows comprises at least one cell of the series of cells.

14. The system of claim 11, wherein the series of cells are printed in a human-recognizable layout.

15. A computer program product for encoding data in a two-dimensional (2D) symbology, the computer program product comprising:
   a non-transitory storage medium readable by a processing circuit and storing instructions for execution by the processing circuit for performing a method comprising:
   assigning a first color representative of a 0-bit and a second color representative of a 1-bit,
   designating a starting cell pair and an ending cell pair,
   generating the 2D symbology, the 2D symbology comprising a series of cells in a cell space starting with the starting cell pair and ending with the ending cell pair, each cell between the starting cell pair and the ending cell pair corresponding to a bit of a binary string and having a common cell length, wherein the cells corresponding to a 0-bit are colored the first color and the cells corresponding to a 1-bit are colored the second color, and
   printing the 2D symbology in the cell space, wherein the cell space is surrounded by a contiguous non-cell space extending a distance greater than the common cell length from the cell space and being of a color different than the first color and the second color.

16. The computer program product of claim 15, wherein the starting cell pair is a 2-bit starting cell pair, and wherein the ending cell pair is a 2-bit ending cell pair.

17. The computer program product of claim 15, wherein the series of cells are printed in a human-recognizable layout.

\* \* \* \* \*